US009564833B2

United States Patent
White et al.

(10) Patent No.: US 9,564,833 B2
(45) Date of Patent: Feb. 7, 2017

(54) SOLID-STATE INVERTERS WITH VOLTAGE-BALANCED SWITCHES

(71) Applicant: Hamilton Sundstrand Corporation, Charlotte, NC (US)

(72) Inventors: Adam M. White, Belvidere, IL (US); Joshua S. Parkin, Loves Park, IL (US); Christopher J. Courtney, Janesville, WI (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 14/295,159

(22) Filed: Jun. 3, 2014

(65) Prior Publication Data

US 2015/0349660 A1    Dec. 3, 2015

(51) Int. Cl.
*H02M 7/537* (2006.01)
*H02M 3/325* (2006.01)
*H02M 7/5387* (2007.01)
*H02M 7/487* (2007.01)
*H02M 1/00* (2006.01)

(52) U.S. Cl.
CPC .............. *H02M 7/537* (2013.01); *H02M 3/325* (2013.01); *H02M 7/487* (2013.01); *H02M 7/5387* (2013.01); *H02M 2001/0054* (2013.01); *Y02B 70/1491* (2013.01)

(58) Field of Classification Search
CPC .................................................... H02M 7/537
USPC ........................................................ 363/132
See application file for complete search history.

(56) References Cited

U.S. PATENT DOCUMENTS

| 6,838,925 B1* | 1/2005 | Nielsen | H02M 7/5387 327/391 |
| 2011/0013438 A1* | 1/2011 | Frisch | H02M 7/48 363/131 |
| 2012/0223667 A1* | 9/2012 | Wang | H02M 3/1588 318/768 |
| 2013/0044527 A1* | 2/2013 | Vracar | H02M 7/487 363/131 |

FOREIGN PATENT DOCUMENTS

WO    WO-2013135181 A1    9/2013

OTHER PUBLICATIONS

Search Report received in European Patent Application No. 15169862.8 on Oct. 22, 2015.

(Continued)

*Primary Examiner* — Matthew Nguyen
*Assistant Examiner* — Trinh Dang
(74) *Attorney, Agent, or Firm* — Locke Lord LLP; Scott D. Wofsy; Christopher J. Cillié

(57) ABSTRACT

A phase leg for a multilevel inverter includes a positive DC lead, a first outer MOSFET connected to the positive DC lead, a first inner IGBT connected to the first outer MOSFET, a second inner IGBT connected to the first inner IGBT, and a second outer IGBT connected to the second inner IGBT. The first and second outer MOSFETs are superjunction MOSFETs voltage balanced by the first and second IGBTs for reducing voltage stress in the solid-state switch phase leg when the superjunction MOSFET and the IGBT are conducting current from the DC lead to the AC lead.

11 Claims, 5 Drawing Sheets

(56) References Cited

OTHER PUBLICATIONS

Kondekar P N et al: Analysis of breakdown voltage and on resistance of super-junction power MOSFET CoolMOS<TM>using theory of novel voltage sustaining layer, [Annual Power Electronics Specialists Conference] vol. 4, Jun. 23, 2002 pp. 1769-1775.

* cited by examiner

| SWITCH | I<br>102<br>TO<br>114 | II<br>112<br>TO<br>114 | III<br>104<br>TO<br>114 |
|---|---|---|---|
| AC NODE VOLTAGE | POSITIVE DC | MIDDLE DC | NEGATIVE DC |
| 120 | CLOSED | OPEN | OPEN |
| 130 | CLOSED | CLOSED | OPEN |
| 140 | OPEN | CLOSED | OPEN |
| 150 | OPEN | OPEN | CLOSED |

FIG. 3

SOLID-STATE INVERTERS WITH VOLTAGE-BALANCED SWITCHES

BACKGROUND OF THE INVENTION

1. Field of the Invention

The present disclosure relates to power converters, and more particularly to multilevel inverters for converting direct current (DC) voltage into alternating current (AC) voltage.

2. Description of Related Art

Inverters convert DC power into AC power. Multilevel inverters employ multiple voltage levels and solid-state switch devices. A controller cycles the solid-state switch devices between on and off states to generate output AC voltage, generally with a stepped waveform approximating a sinusoidal waveform. The solid-state switch devices are typically grouped into phase legs uniformly consisting of either integrated gate bipolar transistors (IGBTs) or field effect transistors (MOSFETs).

IGBT-based inverters are generally preferred in high-voltage, low switching frequency applications because IGBTs exhibit high switching losses at high switching frequencies. Because they generally operate at low frequencies, IGBT-based inverters typically require additional output filtering to smooth the output stepped AC voltage waveform.

MOSFET-based inverters are generally used in low-voltage applications with high switching frequencies due to their relatively low losses. Because they operate at higher frequencies there is less need for filtering, allowing for the use of smaller filter components. However, due to the highly nonlinear output capacitance associated with MOSFET devices, voltage balancing between MOSFETs in a given phase leg can pose challenges, potentially reducing device reliability.

Such conventional methods and systems for power conversion have generally been considered satisfactory for their intended purpose. However, there is still a need in the art for improved converters. The present disclosure provides a solution for this need.

SUMMARY OF THE INVENTION

A three-level inverter includes a phase leg connected to a positive DC lead, a middle DC lead, a negative DC lead, and an AC lead. The phase leg includes first and second outer MOSFETs and first and second inner IGBTs. The first outer MOSFET is connected between the positive DC lead and the middle DC lead through an intervening first clamping diode. The second outer MOSFET is connected between the negative DC and the middle DC lead through an intervening second clamping diode. The first inner IGBT is connected in series with the first outer MOSFET and the AC lead. The second inner IGBT is connected in series with the second outer MOSFET and the AC lead.

In certain embodiments, the first and second outer MOSFETs can be superjunction MOSFETs. Voltage can be balanced between the first outer MOSFET and first inner IGBT while in an off state and when the second outer MOSFET and second inner IGBT are in on states. Voltage can also be balanced between the second inner IGBT and the second outer MOSFET while in an off state and the first outer MOSFET and the first inner IGBT are in on states.

In accordance with certain embodiments, the first and second MOSFETs can have drains and sources. The first and second IGBTs can have collectors and emitters. The first outer MOSFET drain can connect to the positive DC lead. The first inner IGBT collector can connect to the first outer MOSFET source. The second inner IGBT collector can connect to the first inner IGBT emitter. The second outer MOSFET drain can connect to the second IGBT emitter. The second outer MOSFET source can connect to the negative DC lead. The AC lead can connect to the first inner IGBT emitter and the second inner IGBT collector. The middle DC lead can connect to the first outer MOSFET source and the first inner IGBT collector through the intervening first midpoint clamping diode. The middle DC lead can also connect the second IGBT emitter and the second MOSFET drain through the intervening second midpoint clamping diode.

It is further contemplated that in accordance with certain embodiments the phase leg can include a first outer MOSFET free-wheeling diode with an anode and a cathode can be in parallel with the first outer MOSFET. The cathode can connect to the first outer MOSFET drain and the anode can connect to the first outer MOSFET source for conducting inductive free-wheeling current flow toward the positive DC lead. A first inner IGBT free-wheeling diode with an anode and a cathode can be in parallel with the first inner IGBT. The cathode can connect to the first inner IGBT collector and the anode can connect to the first inner IGBT emitter for conducting inductive free-wheeling current flow toward the positive DC lead. A second inner IGBT free-wheeling diode with an anode and a cathode can be in parallel with the second inner IGBT. The cathode can connect to the second inner IGBT collector and the anode can connect to the second inner IGBT emitter for conducting inductive free-wheeling current flow from the negative DC lead. A second outer MOSFET free-wheeling diode with an anode and a cathode can be in parallel with the second outer MOSFET. The cathode can connect to the second outer MOSFET drain and the anode can connect to the second outer MOSFET source for conducting inductive free-wheeling current flow from the negative DC lead.

In certain embodiments the phase leg can include first and second clamping diodes with anodes and cathodes. The first clamping diode anode can be connected to the cathode of the second clamping diode such that clamping diodes are in series with one another. The cathode of the first clamping diode can connect to the collector of the first inner IGBT and the anode of the second clamping diode can connect to the emitter of the second inner IGBT such that the clamping diodes are in parallel with the inner IGBTs. The middle DC lead can connect to the first clamping diode anode for conducting current from the middle DC lead when the first inner IGBT is in an on state. The middle DC lead can also connect to the second clamping diode cathode for conducting current to the middle DC lead when the second IGBT is in an on state.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein:

FIG. 3 is a switch state diagram for the phase leg of FIG. 2, showing switch states for the inner IGBTs and outer MOSFETs;

DETAILED DESCRIPTION OF THE PREFERRED EMBODIMENTS

Figure 1:
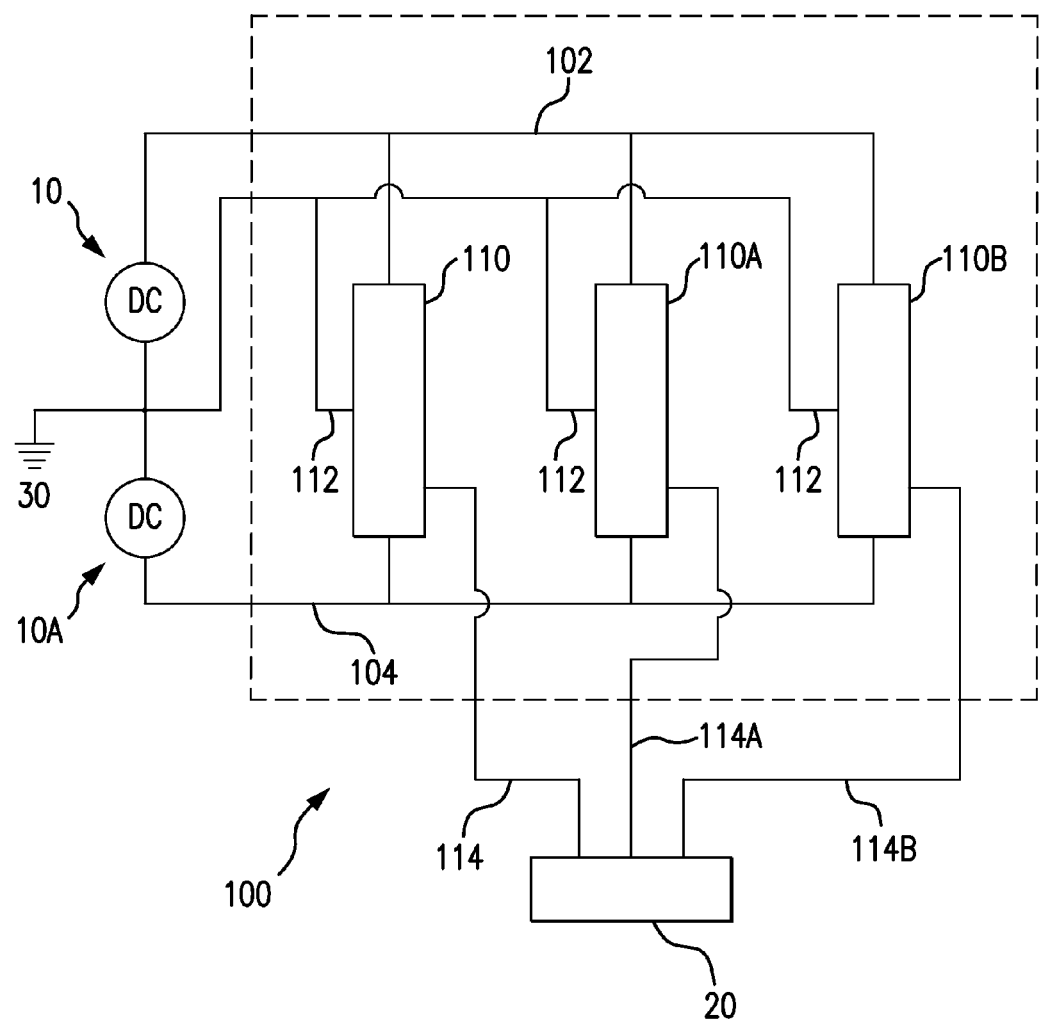
FIG. 1 is a schematic view of an exemplary embodiment of an inverter constructed in accordance with the present disclosure, showing phase legs of the inverter.

Reference will now be made to the drawings wherein like reference numerals identify similar structural features or aspects of the subject disclosure. For purposes of explanation and illustration, and not limitation, a partial view of an exemplary embodiment of the inverter in accordance with the disclosure is shown in FIG. 1 and is designated generally by reference character 100. Other embodiments of inverters in accordance with the disclosure, or aspects thereof, are provided in FIGS. 2-5, as will be described. The systems and methods described herein can be used in power converters, such as three-level, neutral point clamped inverters implemented using discretely packaged devices.

With reference to FIG. 1, inverter 100 is shown schematically. Inverter 100 is connected between a first direct current (DC) power source 10, a second DC power source 10A, and an alternating current (AC) load 20. First and second DC power sources 10 and 10A are configured for providing DC voltage to inverter 100. Load 20 is a load requiring AC voltage. Inverter 100 is a multilevel inverter configured for converting three-lead DC voltage into AC voltage. As illustrated, inverter 100 is a three-level inverter including a first phase leg 110, a second phase leg 110A and a third phase leg 110B each separately connected to three-phase, wye-connected AC load 20.

First phase leg 110, second phase leg 110A and third phase leg 110B are connected in parallel to first DC power source 10 and second DC power source 10A by a positive DC lead 102, a middle DC lead 112, and a negative DC lead 104. Positive DC lead 102 connects to a positive terminal of first DC power source 10. Middle DC lead 112 connects to a negative terminal of first DC power source 10 and a positive terminal of second DC power source 10A. Negative DC lead 104 connects to a negative terminal of second DC power source 10A. As illustrated embodiment, middle DC lead 112 is connected to a ground terminal 30. As will be appreciated by those skilled in the art, middle DC lead 112 may be floating or have a fixed impedance relative to ground within inhibiting functionality of the circuit. A first AC output lead 114 connects first phase leg 110 of inverter 100 to a first terminal of AC load 20. A second AC output lead 114A connects second phase leg 110A to a second terminal of AC load 20. A third AC output lead 114B connects third phase leg 110B to a third terminal of AC load 20.

Inverter 100 is a solid-state inverter having a plurality of switch state configurations wherein switches (shown in FIG. 2) within first phase leg 110, second phase leg 110A, and third phase leg 110B assume different combination of switch states (shown in FIG. 3) for connecting each of first AC output lead 114, second AC output lead 114A and third AC output lead 114B to one of positive DC lead 102, negative DC lead 104, and middle DC lead 112. This converts DC voltage supplied to the phase legs into AC voltage by varying output voltage in a stepwise manner, thereby approximating a sinusoidal AC voltage waveform.

Figure 2:
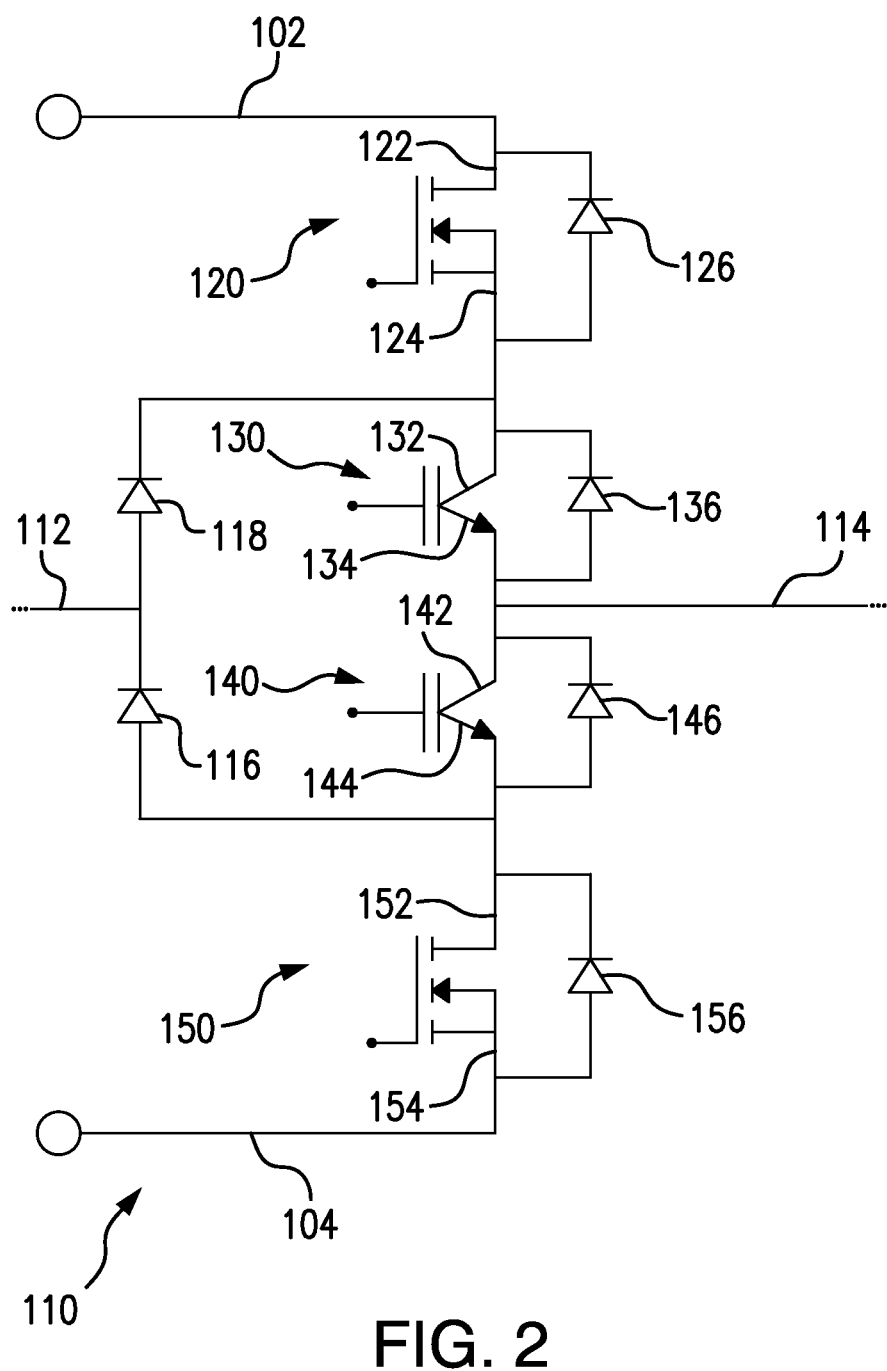
FIG. 2 is a circuit diagram a phase leg of the inverter illustrated in FIG. 1, showing inner IGBTs and outer MOSFET connected in series.

With reference to FIG. 2, a circuit diagram of first phase leg 110 is shown. First phase leg 110 includes a first outer field effect transistor (MOSFET) 120, a first inner insulated gate bipolar transistor (IGBT) 130, a second inner IGBT 140, and a second outer MOSFET 150. First outer MOSFET 120 and second outer MOSFET 150 are both superjunction MOSFETs. First outer MOSFET 120 is connected between positive DC lead 102 and middle DC lead 112. First inner IGBT 130 is connected in series with first outer MOSFET 120 and between middle DC lead 112 and AC lead 114. Second inner IGBT 140 is connected in series with first inner IGBT 130 and between AC lead 114 and negative DC lead 104. Second outer MOSFET 150 is connected in series with second IGBT 140 and between middle DC lead 112 and negative DC lead 104.

First outer MOSFET 120 has a drain 122 and a source 124. Drain 122 connects to positive DC lead 102 and source 124 connects to middle DC lead 112 through an intervening first midpoint clamping diode 118. First inner IGBT 130 has a collector 132 and an emitter 134. Collector 132 connects to source 124 of first outer MOSFET 120 and emitter 144 connects to AC lead 114. Second inner IGBT 140 has a collector 142 and an emitter 144. Collector 142 of second inner IGBT 140 connects to emitter 134 and emitter 144 connects to middle DC lead through an intervening second midpoint clamping diode 116.

Second outer MOSFET 150 has a drain 152 and a source 154. Drain 152 connects to emitter 144 and source 154 connects to negative DC lead 110.

Free-wheeling or anti-parallel diodes with anodes and cathodes are arranged in parallel across first outer MOSFET 120, first inner IGBT 130, second inner IGBT 140, and second outer MOSFET 150. Specifically, a first outer MOSFET free-wheeling diode 126 connects in parallel with first outer MOSFET 120. The cathode of diode 126 is connected to the drain of MOSFET 120 and the anode of diode 126 is connected to the source of MOSFET 120. A first inner IGBT free-wheeling diode 136 connects in parallel with first inner IGBT 130. The cathode of diode 136 is connected to the drain of first inner IGBT 130 and the anode of diode 136 is connected to the source of first inner IGBT 130. A second inner IGBT free-wheeling diode 146 connects in parallel with second inner IGBT 140. The cathode of diode 146 is connected to the drain of second inner IGBT 140 and the anode of diode 146 is connected to the source of second inner IGBT 140. A second outer MOSFET free-wheeling diode 156 connects in parallel with second outer MOSFET 150. The cathode of diode 156 is connected to the drain of second outer MOSFET 150 and the anode of diode 156 is connected to the source of second outer MOSFET 150.

First AC output lead 114 connects between AC load 20 and emitter 134 of first inner IGBT 130 as well as collector 142 of second inner IGBT 140. DC middle lead 112 connects to the anode of diode 118 and the cathode of diode 116. The cathode of diode 118 is connected to the source of first outer MOSFET 120 as well as the collector of second inner IGBT 140. The anode of diode 116 is connected to the emitter of second inner IGBT 140 as well as the drain of second outer MOSFET 150.

In the illustrated embodiment, first phase leg 110 is a neutral point clamped inverter phase leg having a first midpoint clamping diode 118 and a second midpoint clamping diode 116 with anodes and cathodes. The anode of midpoint clamping diode 118 connects to middle DC lead 112. Midpoint clamping diode 118 is arranged to conduct current flow from middle DC lead 112 and though IGBT 130 to AC lead 114 when the second inner IGBT 140 is turned on and conducting current. The cathode of midpoint clamping diode 116 connects to middle DC lead 112. Midpoint clamping diode 116 is arranged to conduct current flow from AC lead 114 and though IGBT 140 to the middle DC lead 112 when the second inner IGBT 140 is turned on and conducting current. It is to be understood that second phase leg 110A and third phase leg 110B are similar to first phase leg 110 with the differences shown in FIG. 1 and described above.

With reference to FIG. 3, a switch configuration table with switch states is shown. First phase leg 110 has a first configuration I, a second configuration II, and a third configuration III. First phase leg 110 alternates between configuration I, configuration III, and configuration III to alternate the connection of AC output lead 144 to between positive DC lead 102, middle DC lead 112, and negative DC lead 104 to invert DC power applied to first phase leg 110 to a single AC phase. It is to be understood that second phase leg 110A (shown in FIG. 1) and third phase leg 110B (shown in FIG. 1) operate in a similar manner at first phase leg 110A with the difference that the fundamental frequency voltage of each leg is out of phase with each of other legs, thereby creating a second and a third AC phase for providing AC voltage to load 20.

In configuration I, first outer MOSFET 120 and first inner IGBT 130 are both in an on state (i.e. electrically closed), and second inner IGBT 140 and second outer MOSFET 150 are both in an off state (i.e. electrically open). This configuration electrically connects positive DC lead 102 to first AC output lead 114. In configuration II, first outer MOSFET 120 and second outer MOSFET 150 are electrically open and first inner IGBT 130 and second inner IGBT 140 are electrically closed. This configuration electrically connects middle DC lead 112 to first AC output lead 114. In configuration III, first outer MOSFET 120 and first inner IGBT 130 are electrically open, and second inner IGBT 140 and second outer MOSFET 150 are electrically closed. This configuration electrically connects negative DC lead 104 to first AC output lead 114. As will be appreciated by those skilled in the art, second phase leg 110A (shown in FIG. 1) and third phase leg 110B (shown in FIG. 1) operate in similar fashion with the difference that, at any given point in time, the plurality of phase leg switches may be configured to different states from one another. As will also be appreciated, switches of first phase leg 110, second phase leg 110A (shown in FIG. 1), and third phase leg 110B (shown in FIG. 1) reconfigure in a synchronized fashion using gate control voltages provided by a controller (not shown for clarity) applied to gate terminals of respective switch MOSFETs or IGBTs. While described sequentially, its is to be understood that phase leg configuration changes can be out of sequence, e.g. configuration III followed by configuration II for example.

Conventional switched inverter phase legs comprised of inner and outer MOSFET devices can experience voltage imbalance between the devices on a dynamic basis due to the highly nonlinear output capacitance characteristic of MOSFET devices. Voltage imbalance can exert additional voltage stress on the MOSFETs, potentially causing damage to the device. For example, during configuration I, when the first outer switch and first inner switch are closed and conducting current, and the second inner switch and second outer switch are open and blocking current flow, there can be increased voltage stress on first inner switch. Similarly, during configuration III, when the first inner switch and the first outer switch block current flow and the second outer switch and the second inner switch permit current flow, there can be increased voltage stress on the second inner switch. As will be appreciated by those skilled in the art, voltage stress in excess of device rating can result in damage to the device and/or loss of efficiency.

Ideally, clamping diodes would clamp the midpoint to the neutral point allowing the voltage between the inner and outer MOSFETs to be balanced. However, in practical application such as when the inner and outer MOSFETs are comprised of discretely packaged devices, there can be significant parasitic inductance in the diode path. Since the difference in output capacitance in the off state can be upwards of three orders of magnitude higher than the on state, the parasitic inductance can prevent excess charge from being removed from the output capacitance of the MOSFETs. Instead, the node voltage at the point of connection between the neutral point clamping diode and the MOSFETs is driven toward the device that had been blocking voltage previously. This causes the inner MOSFETs to experience additional voltage stress.

Figure 4:
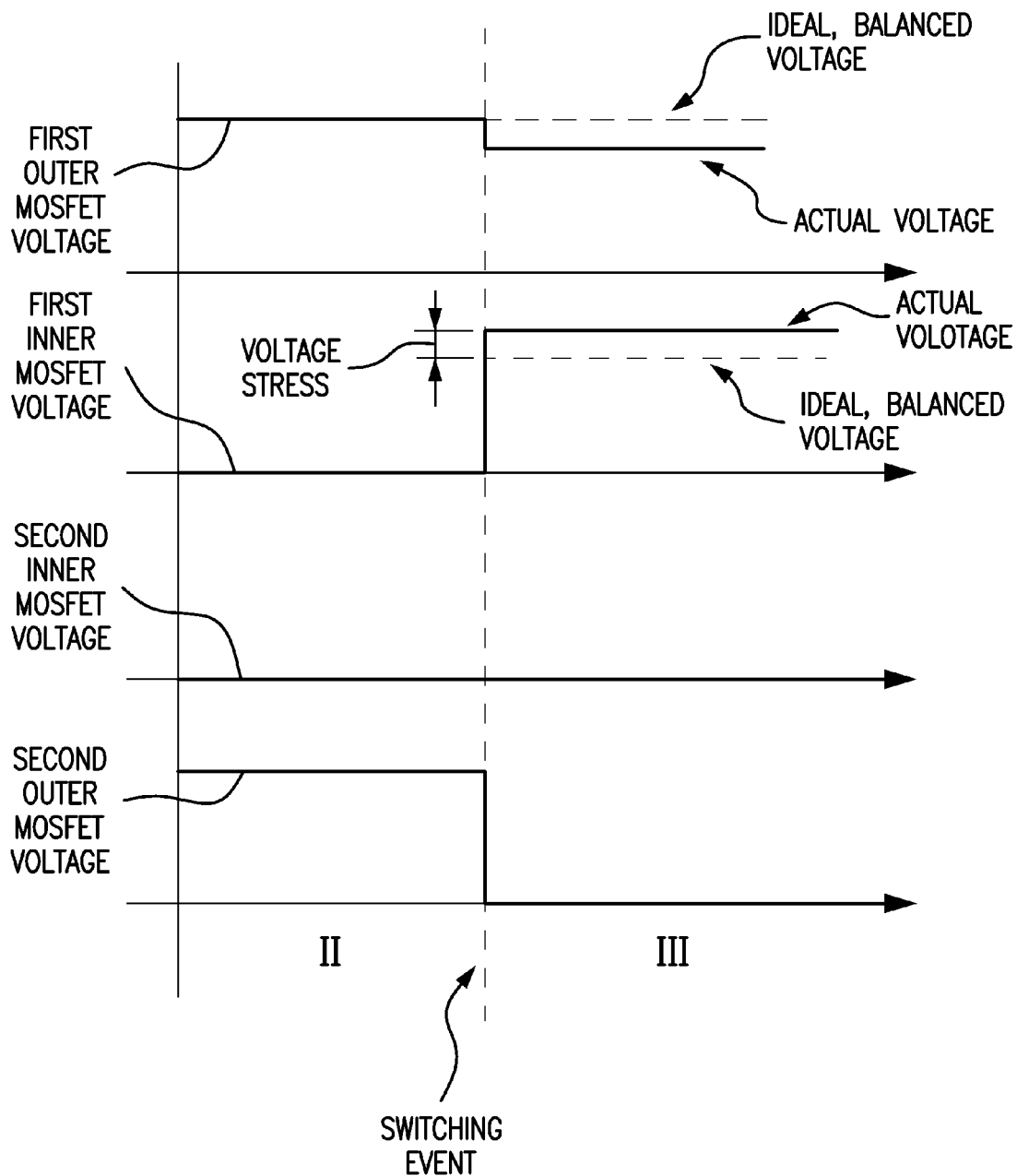
FIG. 4 is a voltage chart for a conventional inverter, showing voltage imbalance between inner MOSFETs and outer MOSFETs following configuration changes.

FIG. 4 illustrates the above-described voltage imbalance problem. The circuit configuration is the same as inverter 100, albeit with the IGBTs in first phase leg 110, second phase leg 110A, and/or third phase leg 110B replaced with superjunction MOSFETs. The inner transistors (now MOSFETs) experience relatively high levels of voltage imbalance and voltage stress during configuration III (and likewise, during configuration I which is not shown) due to the highly nonlinear drain/source capacitance that is characteristic of superjunction MOSFETs.

In three level inverters having neutral point clamping topologies, the load power factor may be high such that the inner switch devices typically do not experience high switching losses. This allows for employing IGBTs for the inner switch devices and MOSFETs for the outer switch devices. Since IGBTs have relatively low and linear output capacitance in relation to MOSFETs the problem of excess charge driving the node voltage is removed. This enables the devices to block more equal voltages while achieving high switching frequencies, e.g. in the range of about 50 kilohertz to about 100 kilohertz. It can also provide more equal voltage balancing, reducing voltage stress and reducing the likelihood of device damage due to voltage stress at voltages greater than about 250 volts.

Figure 5:
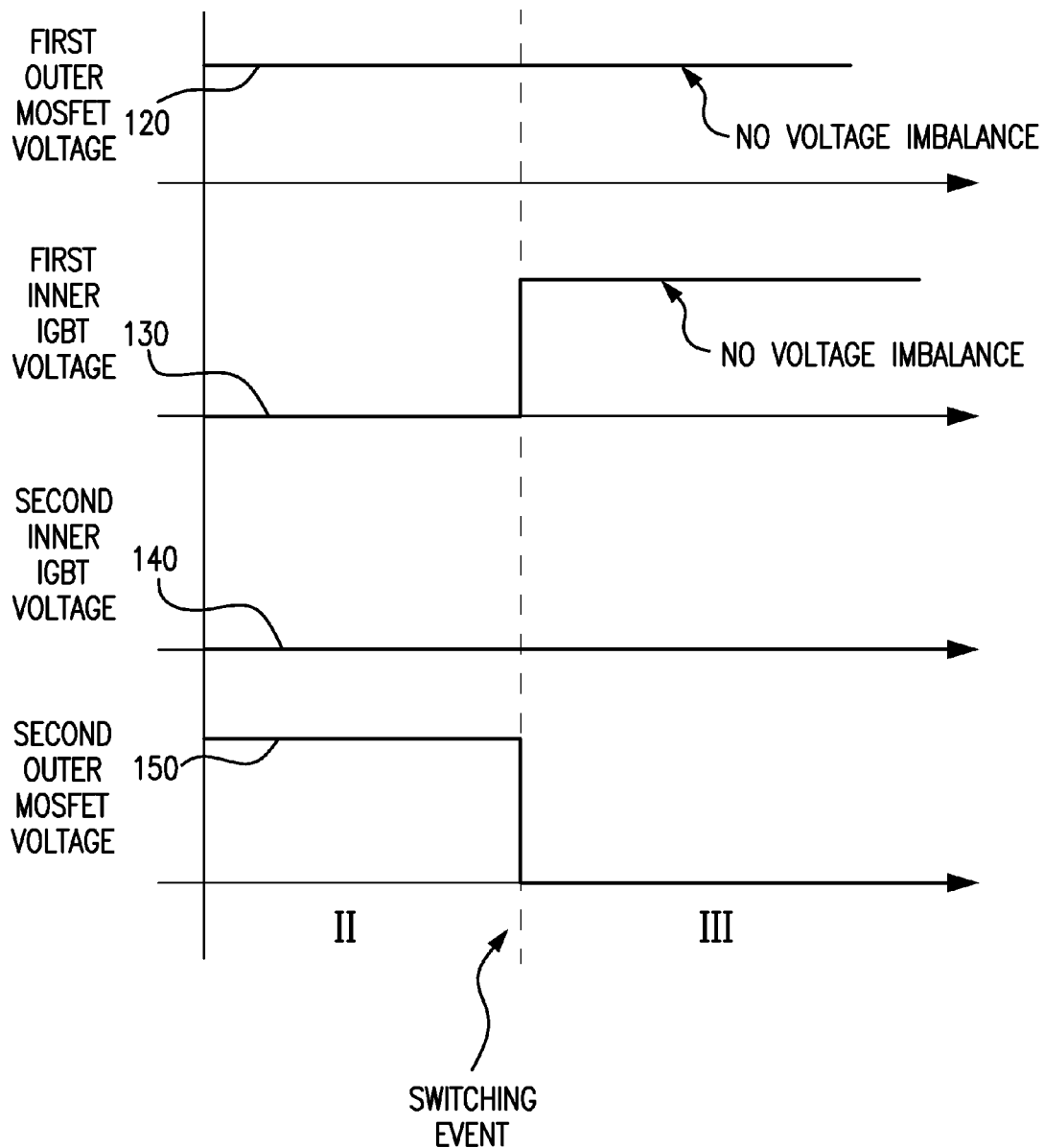
FIG. 5 is a voltage balance chart for an inverter in accordance with the present disclosure, showing voltage balance between inner IGBTs and outer MOSFETs following configuration changes.

FIG. 5 illustrates the above-described technical effect. As illustrated, embodiments of inverter 100 having first phase leg 110, second phase leg 110A, and/or third phase leg 110B including first inner IGBT 130 and second inner IGBT 140 experience relatively low levels of voltage imbalance and voltage stress during configuration III (and likewise, during configuration I which is not shown) due to the relatively linear collector/emitter capacitance that is characteristic of IGBTs. This arises from the relatively linear capacitance characteristic of IGBTs in comparison to the relatively non-linear capacitance characteristic of superjunction MOSFETs. It is contemplated that capacitance of first and second outer MOSFETs is at least three times capacitance of the first and second IGBTs following a change between an on state and an off state.

The methods and systems of the present disclosure, as described above and shown in the drawings, provide for inverters with superior properties including reduced voltage imbalance and voltage stress during certain switch combinations during switch cycling. While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A phase leg for a multilevel inverter, comprising:
a positive DC lead;
a first outer MOSFET connected to the positive DC lead;
a first inner IGBT connected to the first outer MOSFET;
a second inner IGBT connected to the first inner IGBT; and
a second outer MOSFET connected to the second inner IGBT, wherein the first and second outer MOSFETs are voltage balanced superjunction MOSFETs by the first and second IGBTs for reducing voltage stress in the solid-state switch phase leg when the superjunction MOSFET and the IGBT are conducting current from the DC lead to an AC lead,
wherein the switching speed of at least one of the first and second outer MOSFETs is greater than about 10 kilohertz,
wherein the source/drain capacitance of the first and second outer MOSFETs is at least three times collector/emitter capacitance of the first and second IGBTs following a change between an on state and an off state.

2. The phase leg as recited in claim 1, wherein the AC lead is connected between the first inner IGBT and the second inner IGBT.

3. The phase leg as recited in claim 1, further including a negative DC lead connected to the second outer MOSFET.

4. The phase leg as recited in claim 1, further including a middle DC lead connected (a) between the first outer MOSFET and the first inner IGBT and (b) between the second outer MOSFET and the second inner IGBT.

5. The phase leg as recited in claim 1, further including a free-wheeling diode connected in parallel with the first inner IGBT.

6. The phase leg as recited in claim 1, further including a free-wheeling diode connected in parallel with the second inner IGBT.

7. The phase leg as recited in claim 1, further including a free-wheeling diode connected in parallel with the first outer MOSFET and in series with the first inner IGBT.

8. The phase leg as recited in claim 1, further including a free-wheeling diode connected in parallel with the second outer MOSFET and in series with the second inner IGBT.

9. The phase leg as recited in claim 4, further including a clamping diode connected to the middle DC lead and between the first outer MOSFET and the first inner IGBT.

10. The phase leg as recited in claim 9, wherein the clamping diode is a first clamping diode and further including a second clamping diode connected to the middle DC lead and between the second outer MOSFET and the second inner IGBT.

11. A three-phase inverter, comprising:
a positive DC lead, a middle DC lead, and a negative DC lead;
a first AC lead, a second AC lead, and a third AC lead; and
a first phase leg, a second phase leg, and a third phase leg coupling the DC leads to the AC leads, wherein each phase leg includes:
a first outer MOSFET connected to the positive DC lead;
a first inner IGBT connected to the first outer MOSFET and the middle DC lead;
a second inner IGBT connected to the first inner IGBT and one of the first, second, and third AC leads; and
a second outer MOSFET connected to the second inner IGBT, wherein the first and second outer MOSFETs are superjunction MOSFETs voltage balanced by the first and second IGBTs,
wherein the source/drain capacitance of the first and second outer MOSFETs is at least three times collector/emitter capacitance of the first and second IGBTs following a change between an on state and an off state,
wherein the switching speed of at least one of the first and second outer MOSFETs is greater than about 10 kilohertz,
wherein voltage across the positive and negative DC leads is greater than about 250 volts.

* * * * *